(12) United States Patent
Clucas

(10) Patent No.: US 7,168,234 B2
(45) Date of Patent: Jan. 30, 2007

(54) RECUPERATIVE HEATER FOR AN EXTERNAL COMBUSTION ENGINE

(75) Inventor: Donald Murray Clucas, Christchurch (NZ)

(73) Assignee: Whisper Tech Limited, Christchurch (NZ)

( * ) Notice: Subject to any disclaimer, the term of this patent is extended or adjusted under 35 U.S.C. 154(b) by 0 days.

(21) Appl. No.: 10/505,847

(22) PCT Filed: Feb. 26, 2003

(86) PCT No.: PCT/NZ03/00037

§ 371 (c)(1),
(2), (4) Date: Mar. 15, 2005

(87) PCT Pub. No.: WO03/072921

PCT Pub. Date: Sep. 4, 2003

(65) Prior Publication Data

US 2005/0188692 A1  Sep. 1, 2005

(30) Foreign Application Priority Data

Feb. 26, 2002 (NZ) ....................... 517441

(51) Int. Cl.
*F02C 9/00* (2006.01)
(52) U.S. Cl. .......................... 60/39.2; 60/524
(58) Field of Classification Search ................. 60/39.2, 60/517, 520, 524, 526
See application file for complete search history.

(56) References Cited

U.S. PATENT DOCUMENTS

| | | | |
|---|---|---|---|
| 3,717,993 A | 2/1973 | Potter | ............................ 60/24 |
| 3,942,324 A | 3/1976 | Johansson et al. | ............ 60/517 |
| 4,085,588 A * | 4/1978 | Reams et al. | ................. 60/517 |
| 4,364,724 A | 12/1982 | Alpkvist | ...................... 431/11 |
| 5,755,100 A * | 5/1998 | Lamos | ........................ 60/521 |
| 6,019,968 A | 2/2000 | Platz et al. | |
| 6,033,208 A * | 3/2000 | Wunning | .................... 431/215 |
| 6,293,275 B1 | 9/2001 | Wunning | |
| 6,430,925 B2 | 8/2002 | Heikrodt | |
| 2004/0172877 A1 * | 9/2004 | Wunning | .................. 48/102 A |

FOREIGN PATENT DOCUMENTS

| | | |
|---|---|---|
| DE | 101 00 729 C2 | 1/2001 |
| DE | 10119083 * | 4/2001 |
| EP | 1 083 393 B1 | 8/2000 |
| EP | 1 083 393 A1 | 3/2001 |
| WO | WO 96/07864 | 3/1996 |

* cited by examiner

*Primary Examiner*—Hoang Nguyen
(74) *Attorney, Agent, or Firm*—Greer, Burns & Crain, Ltd.

(57) ABSTRACT

A recuperative heater for heating the heater heads of an external combustion machine includes a recuperative heat exchanger having an axial pass section partially surrounding the combustion chamber. Combustion products pass from the recuperative heat exchanger to a condensing exhaust gas heat surrounding the axial pass section and comprising a cylindrical exhaust gas passage ringed externally by a water jacket. Water from the water jacket may be circulated to a thermal load. A top cover of the heater opposes the heater heads or hot end of the engine. Inner and outer plenums are formed between the combustion chamber wall and the top cover and inlet air is heated in stages as its enters the outer plenum, passes into the axial pass section, into the inner plenum, then into the combustion chamber.

15 Claims, 2 Drawing Sheets

RECUPERATIVE HEATER FOR AN EXTERNAL COMBUSTION ENGINE

TECHNICAL FIELD

The present invention relates generally to a recuperative heater for an external combustion machine, and more particularly to a recuperative heater with an exhaust gas heat exchanger. Most particularly the invention relates to a heater for supplying operating heat to a Stirling engine used in a cogeneration system.

BACKGROUND ART

A number of closed-cycle thermodynamic machines operate with heat from a high-grade source, typically in the form of a fossil fuel burner, to directly heat a heat exchanger or heater head integral with the machine. A Stirling engine is an example of such an external combustion thermodynamic machine.

Stirling engines are well suited to cogeneration (or combined heat and power) applications and offer significant potential advantages. Stirling engines have a low emission external combustion system, thereby allowing multiple fuels to be used, preventing internal parts becoming fouled by the combustion products and providing quiet operation. However to realize these advantages in systems for the mass market, not only are issues of working lifespan, noise and emissions important but efficiency of fuel use and maintaining a cool engine compartment are key considerations. For maximum efficiency it is necessary to recover a portion of the latent, as well as the sensible heat of the water vapor formed in the combustion process. Moreover, particularly for domestic applications, size, cost, simplicity of construction and maintenance of the systems become very significant considerations.

A burner of the applicant's design, for use in a Stirling engine, is described in WO/9940309. The heating system used therein is one in which the combustion products from the burner are first sent through a heat exchanger or heater head for transferring heat to the working fluid of the Stirling engine. This compact burner provides recuperative heat exchange means in a device that can be economically manufactured. When used in a micro-cogeneration system, the exhaust gases from the burner pass to a separate (preferably condensing) exhaust gas heat exchanger for the production of hot water for space and potable water heating.

However, this type of configuration poses disadvantages in this and other systems utilizing a conventional exhaust gas heat exchanger. The disadvantages largely stem from the incorporation of the heat exchanger as a subsequent addition to the engine rather than as an integral engine design element. In particular, disadvantages in conventional systems include:

- The heat exchanger requires connection to the engine exhaust via some form of coupling or duct. In a typical configuration, a rigidly mounted heat exchanger is connected to an engine mounted on vibration isolators and thus a flexible exhaust coupling is required. The complexity and cost of producing a reliable exhaust coupling are increased by the harsh environmental conditions including the effects of corrosive high temperatures exhaust gases.
- Heat is lost directly from the coupling. The inherent design constraints of a non-integrated flexible exhaust coupling hinder the efficient prevention of heat losses.
- Constrained and/or uneven gas flow.
- Increased manufacturing and operational system complexity and thus cost.
- Heat is only recovered from the exhaust gases and not from other heated engine surfaces/components.
- Separate thermal insulation surrounding the engine is required to prevent heat losses and undesirably high exterior surface temperatures.
- Additional heat exchanger fluid connections are necessary.
- Increased system dimensions
- Increase system weight It is an object of the present invention to address the foregoing problems or at least to provide the public with a useful choice.

Further aspects and advantages of the present invention will become apparent from the ensuing description which is given by way of example only.

Any publication cited in this specification is hereby incorporated by reference, however this does not constitute an admission that the document forms part of the common general knowledge in the art, in New Zealand or in any other country. The applicant reserves the right to challenge the pertinency of any publication cited herein, or to challenge the accuracy of any assertion made in a cited publication. As used herein, the word "comprises" means "includes, but is not limited to" and its derivatives have a corresponding meaning.

DISCLOSURE OF THE INVENTION

According to one aspect of the present invention there is provided a fluid heat exchanger for a combustion engine including a heated combustion portion, characterised in that said fluid heat exchanger at least partially surrounds said combustion portion and forms an integrated portion of said engine structure.

Preferably, said heat exchanger surrounds said combustion portion substantially symmetrically.

As used herein, the combustion engine includes both internal and external combustion engines fuelled by any appropriate combustible substance.

The heated combustion portion may include any portion of a combustion engine where heat is generated as part of the combustion process creating motive force and heat including, but not limited to, a piston and cylinder configuration or Wankel rotors from 2-stroke, 4-stroke, or diesel internal combustion engine, or a combustion chamber from an external combustion chamber such as a Stirling engine or gas turbine.

The term engine structure is defined as including the outer and inner engine surfaces, walls, housing, structural and/or load bearing portions, combustion portion surrounds and the like.

It will be further appreciated that said fluid may be any flowable gas or liquid capable of effecting thermal heat transfer of heat away from the heated combustion portion, including, but not restricted to water, oil and air.

Preferably, said fluid heat exchanger is a adapted for receiving combustion products from the heated combustion portion into a heat exchange relationship with said fluid By incorporating the exhaust gas heat exchanger in an engine according to the above configuration, numerous advantages are realised.

Firstly, virtually all the heat generated in the combustion portion can flow into the exchanger fluid and thereby increasing efficiency of energy recovered from the fuel significantly.

Secondly, as the heat exchanger may be formed as a rigidly fixed portion of the engine structure, there is no requirement for a flexible coupling between the heat exchanger and the combustion products outlet from the combustion portion. This can reduce manufacturing and system costs and complexity, whilst improving reliability.

Furthermore, instead of an asymmetrical weight loading imposed on the engine by the connection of an external heat exchanger to the high temperature combustion exhaust outlet with or without a flexible coupling, the heat exchanger may be configured to place an even load on the engine.

Thus, according to a further aspect, said fluid heat exchanger is located about said combustion portion to place a symmetrical gravitational load on the engine.

Further advantages of the present invention over the prior art include;
- the exhaust gases exiting the heat exchanger are at a low temperature and any flexible duct/coupling still required may be formed from cheap adaptable materials such as flexible polymer;
- the flow of the combustion exhaust gases may be configured to be evenly distributed; and
- a recuperator (i.e. a heat exchanger utilising the combustions products to preheat one or more of the pre-combustion constituents e.g. air) may be readily incorporated into the engine design.

Thus, according to one embodiment, the present invention further includes a recuperative heat exchanger adapted for receiving combustion products said from heated combustion portion, the recuperative heat exchanger forcing one or more pre-combustion constituents into a heat exchange relationship with the combustion products in order to heat the pre-combustion constituents before being passed to the combustion portion.

Preferably, at least one of said pre-combustion constituents is air and said heated combustion portion is a combustion chamber of an external combustion engine.

According to one aspect of the present invention there is provided a recuperative heater for an external combustion machine including:
- means for combusting fuel in a combustion chamber configured to transfer heat to a heater head of the machine;
- a recuperative heat exchanger adapted for receiving combustion products from the combustion chamber, the recuperative heat exchanger forcing inlet air into a heat exchange relationship with the combustion products in order to heat the air by thermal transfer from the combustion products before the air is passed to the combustion chamber; and
- an exhaust gas heat exchanger adapted for receiving the combustion products from the recuperative heat exchanger, the exhaust gas heat exchanger forcing a fluid into a heat exchange relationship with the combustion products in order to heat the fluid by thermal transfer from the combustion products, and wherein the exhaust gas heat exchanger at least partially surrounds both the combustion chamber and the recuperative heat exchanger.

Preferably the exhaust gas heat exchanger includes an exhaust gas passage adjacent to a jacket for receiving the fluid, the jacket at least partially surrounding both the combustion chamber and the recuperative heat exchanger. By at least partially surrounding the combustion chamber and the recuperative heat exchanger, the fluid in the jacket is able to absorb heat that my otherwise be lost. The fluid is preferably a liquid (e.g. water) circulated through the jacket.

The exhaust gas heat exchange takes place during a single axial pass, before the combustion products pass to the flue. Preferably this single pass approximates a contra-flow action with the fluid flow through the jacket. The combustion products preferably pass in a cylindrical passage adjacent the inner wall of the jacket. Means are provided for improving the heat transfer from the combustion products, preferably comprising fins formed in the inner wall of the water jacket and projecting into the exhaust gas passage.

Preferably the recuperative heat exchanger includes a plurality of parallel elongate channels comprising alternating combustion product channels and inlet air channels adjacent thereto for heat exchange therebetween. The channels at least partially surround the combustion chamber and a first end of each combustion product channel receives combustion products from the combustion chamber and an opposing end of each combustion product channel provides the combustion products to the exhaust gas heat exchanger. The channels are formed between two coaxial cylindrical surfaces that abut the crests of a corrugated thin heat-conductive guide.

Preferably, the exhaust gas heat exchanger is separated from the recuperator axial flow section by an insulator.

Preferably the recuperative heat exchanger further includes an outer space or plenum positioned adjacent to an outer surface of the heater and adapted such that inlet air introduced into the outer plenum cools the outer surface. The outer surface may be a top cover opposing the heater heads or hot end of the engine, the water jacket bounding the sides and the cover the top of the heater. Preferably the recuperative heat exchanger also includes an inner enclosure or plenum separated from the outer plenum by a heat conductive wall, the inner plenum being positioned inwardly of the outer plenum in a space substantially bounded by a wall of the combustion chamber and the heat conductive wall and adapted such that inlet air form the outer plenum passes through the channels into the inner plenum, from which it passes into the combustion chamber. Pairs of flow paths, between combustion air in the outer plenum and the inner plenum, and between the combustion air in the inner plenum and the combustion products in the combustion chamber approximate to contra-flow passes.

Preferably, in the exhaust gas heat exchanger the combustion products are cooled to cause at least a portion of the combustion products to condense.

Most preferably the heater is installed on a Stirling engine forming part of a cogeneration system for providing heat and electricity, the engine driving an electrical generator and supplying a liquid heated by the engine and the exhaust gas heat exchanger to a heating circuit. Alternatively, the heater may be used in other external combustion engines for providing improved energy efficiency within a single compact device.

The heater is compact and may be readily fabricated. Without external insulation, all the outer components present no danger of burning the user, the water jacket cooling the sides and the plenum arrangement cooling the top cover. It is effective and efficient in operational use, may be economically constructed and has an overall simple design that minimizes manufacturing costs and maximizes performance, and simplifies maintenance by offering an essentially modular design.

In an alternative embodiment, the additional heated products (typically air and/or combustion products) sourced externally from the engine may be introduced into the flow from the engine combustion products passing from the recuperator to the exhaust heat exchanger.

Such a configuration is particularly suited to domestic environments where the heated fluid generated by the exhaust heat exchanger requires supplementation by an additional burner to provide the total household needs.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
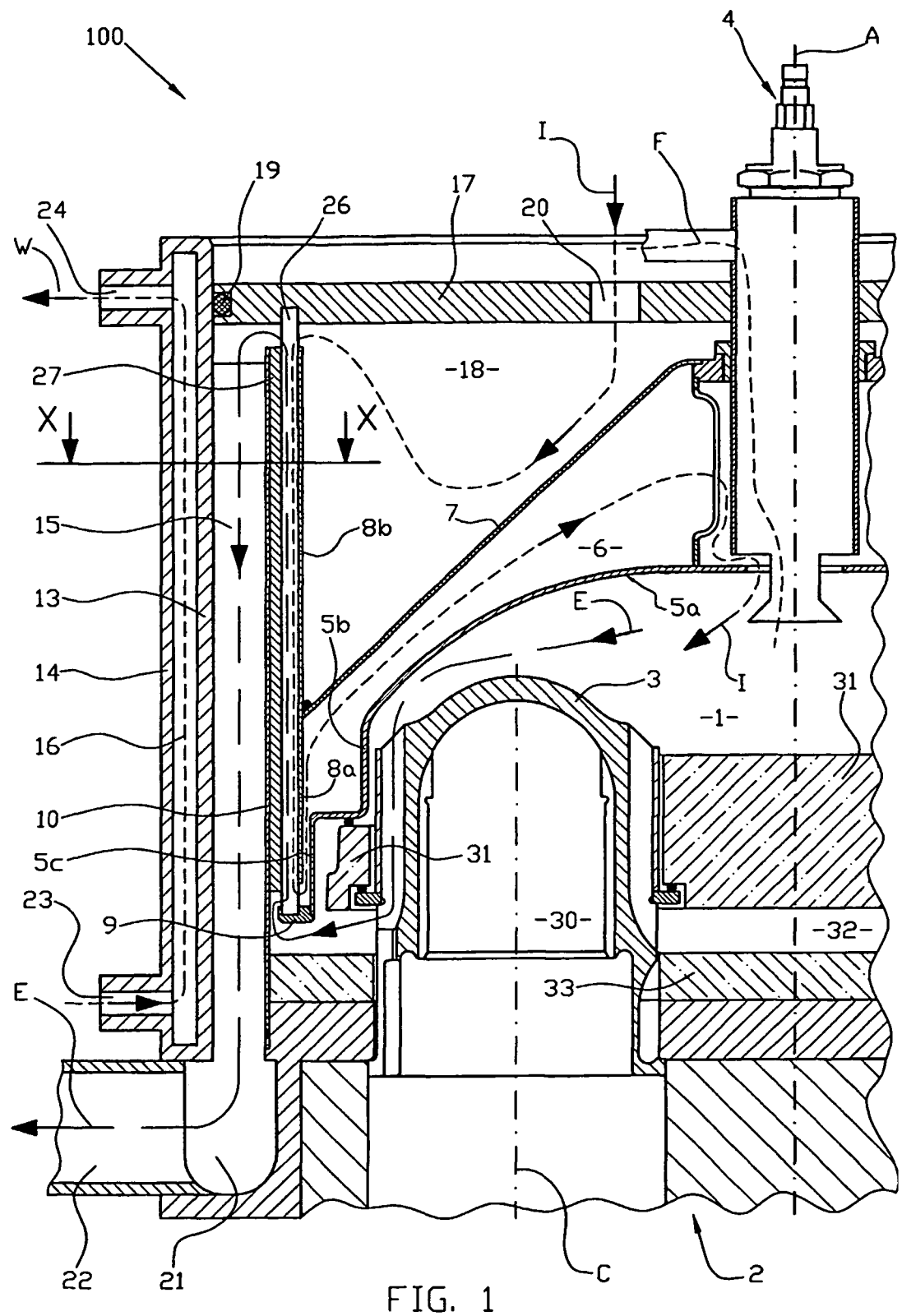
FIG. 1 is a half-sectional elevation through a central plane of the recuperative heater of the present invention.
Figure 2:
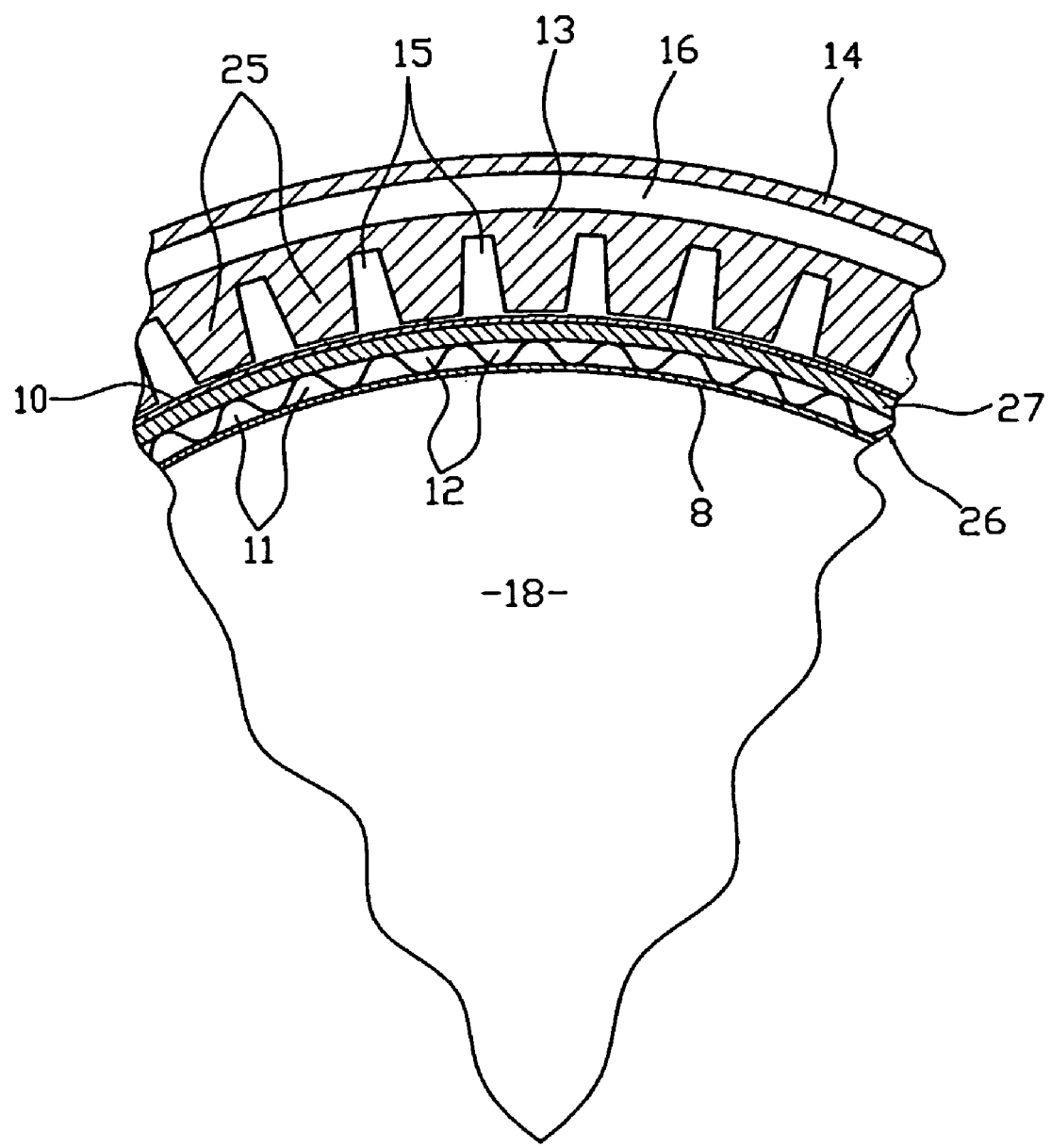
FIG. 2 is a scrap section along line XX of FIG. 1.

Referring to FIGS. 1 and 2, a first preferred embodiment of the recuperative heater 100 of the present invention is installed on a Stirling engine 2.

It will be appreciated that while a Stirling engine is shown in the preferred embodiment, the present invention is not necessarily restricted to same. It can be seen by one skilled in the art that the concept of integrating an exhaust heat exchanger into the structure of a combustion engine may be equally applied to internal and external combustion engines. Furthermore, the exact configuration shown in the preferred embodiment is but one example of numerous possible implementations which also fall within the scope of the invention.

As shown in the drawings, the present invention is integrated into the structure of a Stirling engine 2 having an axis A, with four vertical cylinders 30 in a square arrangement. The principal components of the heater 100 are generally symmetrical about axis A, which extends parallel to the axes C of the cylinders 30. The heater 100 surrounds the hot end or heater heads 3 of the engine 2 and serves for heating a combustion chamber 1 for supplying operating heat to the engine 2. Preferably the heater 100 forms part of a micro-cogeneration system (not shown) whereby electrical power is derived from the engine 2 and the heater 100 also supplies heat to a load (not shown).

Centrally positioned at the top of the heater 100, a fuel distributor 4 (illustrated schematically) is provided, through which fuel (e.g. natural gas, diesel oil or the like) can be supplied to the combustion chamber 1. The combustion chamber 1 is bounded outwardly by a domed combustion chamber wall 5a and inwardly by the heater head 3 of the engine 2 and a centrally positioned insulator 31. The combustion chamber wall 5a is a section of a shell 5 which also includes an intermediate cylindrical portion 5b surrounded by a larger diameter coaxial peripheral portion 5c.

A recuperative heat exchanger (not numbered separately) through which the inlet air passes as it is preheated includes an inner chamber or plenum 6, an outer housing or plenum 18 and an axially extending single pass air/exhaust contra-flow section comprising alternating inlet air and exhaust gas channels 11 and 12 respectively (best seen in FIG. 2).

The inner plenum 6 is a space positioned outwardly from the combustion chamber 1. A cylindrical wall 8 of the inner channels 11 is radially spaced from the cylindrical portion 5c, and is joined to an upright conical plenum wall 7, to divide the wall 8 into lower and upper sections 8a and 8b respectively. The inner plenum 6 is bounded generally by shell sections 5a and 5b, the lower cylindrical section 8a and the conical plenum wall 7.

The inlet air and exhaust gas channels 11 and 12 are formed by a corrugated guide 26 received in a space between the cylindrical wall 8 and a radially separated cylindrical insulator 27. The inlet air channels 11 are formed on the inner side of the guide 26, the crests of the corrugations being in contact with the cylindrical wall 8 to enclose passages 11 therebetween. The combustion product channels 12 are similarly formed on the outer side of the guide 26 and bounded by the insulator 27 such that the channels 11 and 12 alternate in the radial direction and form a ring encircling the combustion chamber 1. The upper end of the corrugated guide 26 is fixed to a disc-like top cover 17 and its lower end is connected by a ring 9 to the lower peripheral edge of the shell 5.

The outer plenum 18 is a space formed between the conical plenum wall 7, the upper cylindrical section 8b and a top cover 17. The top cover 17 encloses the top of the heater 100 and receives the fuel distributor 4. The top cover 17 extends between the inner water jacket walls 13 and is provided with a seal 19 around its perimeter. Combustion air is supplied through an opening 20 in the top cover 17 and into the outer plenum 18.

An exhaust gas heat exchanger (not numbered separately) for extracting heat from the exhaust gases is in the form of an axially extending single pass exhaust/water contra-flow section comprising a finned exhaust passage 15 and an adjacent cylindrical water jacket 16. The exhaust gas heat exchanger at least partially surrounds the combustion chamber 1 and the recuperative heat exchanger to capture the heat flowing radially outward.

The combustion chamber 1 and recuperative heat exchanger are within the water jacket 16 which partially surrounds them. The cylindrical water jacket 16 rings the heater 100, and has inner and outer walls 13 and 14 respectively. Water inlet 23 and water outlet 24 are positioned at the lower and upper ends of the water jacket 16 respectively. The water inlet and outlet 23, 24 are connected to a circuit (not shown) for supplying heat to the load (e.g. for space or potable water heating). Baffles (not shown) direct water flow evenly through the water jacket 16.

The annular passage 15 is formed between the inner water jacket wall 13 and a cylindrical exhaust passage wall 10 which abuts the outer face of the insulator 27. Heat exchange fins 25 are formed on the inner water jacket wall 13 extend into the passage 15. Ringing the heater 100 at the base of the passage 15 is a condensate and exhaust chamber 21 having a flue 22.

The exhaust gas heat exchanger is mounted on the top of the engine 2 and is assembled from the cast aluminium water jacket 16 and the separately fabricated exhaust passage wall 10. The recuperative heat exchanger is a weldment, with the shell 5, cylindrical wall 8, ring 9 and corrugated guide 26 being formed from stainless steel plate. This assembly is then received axially within the exhaust gas heat exchanger, supported on a shoulder formed between portions 5b and 5c upon the outer ring of insulator 31 sealed about the heater head 3.

Proceeding from the cold rest state, first in the starting operation, fuel is supplied through the fuel distributor 4 along path F at the base of the fuel distributor 4 the fuel and air are mixed and directed to the combustion chamber 1 where the air/fuel mixture is ignited and burned.

Inlet combustion air flows into the recuperative heat exchanger and follows the path schematically represented by line I in FIG. 1. Air supplied through opening 20 enters the outer plenum 18, cooling the conical plenum wall 7 and top cover 17 and passing through the circumferentially extending gap between the guide 26 and the top of the cylindrical wall section 8b into the passages 11. In the passages 11 the air is heated by contra-flow exhaust gases passing in the passages 12. At the lower end of the passages 11, the air passes through a circumferential opening between the lower wall section 8a and shell portion 5c into the inner plenum 6. The air in the inner plenum 6 passes over one side of the combustion chamber wall 5a applying a cooling effect to the wall. The air is partly heated through the combustion chamber wall 5a and is then directed through openings in the base of the fuel distributor 4, where it is mixed with the fuel before passing into the combustion chamber 1 where it is burned.

The line E in FIG. 1 schematically represents the path followed by the combustion products. After flowing over the heater head (3), combustion products flow first though the recuperative heat exchanger and then through the exhaust gas heat exchanger. From the combustion chamber 1, the combustion products flow out radially, then axially, applying a heating effect to the heater head 3 of the engine 2 before passing into plenum 32 and then through a circumferential gap between the insulation 27 and the guide 26 into the lower end of the channels 12. The plenum 32 is located immediately above a lower ceramic insulator 33 spanning the width of the combustion chamber 1 and acts to protect the engine from the corrosive combustion products and high temperatures.

The upper end of the wall 10 is axially separated from the top cover 17, providing a space through which the exhaust passes into the passage 15. Flowing downwardly through the passage 15, water vapour in the exhaust is at least partially condensed by the cooling action of water in the water jacket 16. Condensate (not shown) and exhaust gases are collected in the plenum chamber 21, from which they are withdrawn through the flue 22.

Water flows through the water jacket 16 in a circuit (e.g. to a load—not shown) its path schematically represented by the line W extending between the inlet and outlet 23, 24.

It will be appreciated that the radiative and convective heat transfers in the heater 100, occur in approximately contra-flow arrangements in both the recuperative and exhaust gas heat exchangers, with heat flowing from the inner plenum 6 to the outer plenum 18, from the combustion chamber to the inner plenum 6 and from channels 11 to channels 12 (for recuperatively heating the inlet air) and from passage 15 to the water jacket (for recovering heat from the exhaust).

Although illustrated as substantially enclosing the top portion of the engine 2, it should be understood this is primarily due to the configuration of further components present in the applicant's own Stirling engine design (as described in WO/9940309). Consequently, the exhaust heat exchanger may be designed to substantially envelop a larger portion of the engine or even completely enclose same. The greatest heat is naturally generated in the regions adjacent the combustion portion of the engine, though it is still possible to recover heat from areas located more distally to the combustion process.

Aspects of the present invention have been described by way of example only and it should be appreciated that modifications and additions may be made thereto without departing from the scope thereof.

The invention claimed is:

1. A recuperative heater for an external combustion machine comprising:

means for combusting fuel in a combustion chamber configured to transfer heat to a heater head of the machine;

a recuperative heat exchanger adapted for receiving combustion products from the combustion chamber, the recuperative heat exchanger forcing inlet air into a heat exchange relationship with the combustion products in order to heat the air by thermal transfer from the combustion products before the air is passed to the combustion chamber;

an exhaust gas heat exchanger adapted for receiving the combustion products from the recuperative heat exchanger, the exhaust gas heat exchanger forcing a fluid into a heat exchange relationship with the combustion products in order to heat the fluid by thermal transfer from the combustion products; and the exhaust gas heat exchanger at least partially surrounds both the combustion chamber and the recuperative heat exchanger.

2. The recuperative heater as claimed in claim 1, wherein the exhaust gas heat exchanger includes an exhaust gas passage adjacent to a jacket for receiving the fluid, the jacket at least partially surrounding both the combustion chamber and the recuperative heat exchanger.

3. The recuperative heater as claimed in claim 2 wherein heat transfer fins are provided in the inner wall of the jacket projecting into the exhaust gas passage.

4. The recuperative heater as claimed in any one of the claims 1 claim 1, wherein the recuperative heat exchanger includes a plurality of parallel elongate channels comprising alternating combustion product channels and inlet air channels adjacent thereto for heat exchange therebetween.

5. The recuperative heater as claimed in claim 4, wherein the channels at least partially surround the combustion chamber and a first end of each combustion product channel receives combustion products from the combustion chamber and an opposing end of each combustion product channel provides the combustion products to the exhaust gas heat exchanger.

6. The recuperative heater as claimed in claim 1, wherein the recuperative heat exchanger is at least partially surrounded by an insulator.

7. A recuperative heater for an external combustion machine comprising:

means for combusting fuel in a combustion chamber configured to transfer heater to a head of the machine;

a recuperative heat exchanger adapted for receiving combustion products from the combustion chamber, the recuperative heat exchanger having a plurality of parallel elongate channels at least partially surrounding the combustion chamber, the channels comprising alternating combustion product channels and inlet air channels adjacent thereto for heat exchange therebetween, a first end of each combustion product channel receiving combustion products from the combustion chamber and an opposing end of each combustion product channel providing the combustion products to an exhaust gas heat exchanger;

the exhaust gas heat exchanger being adapted for receiving the combustion products from the recuperative heat exchanger, the exhaust gas heat exchanger having an exhaust gas passage adjacent to a jacket for receiving a fluid and heating the fluid by thermal transfer from the combustion products, the exhaust gas heat exchanger at least partially surrounding both the combustion chamber and the recuperative heat exchanger; and the recuperative heat exchanger further includes an outer plenum positioned adjacent to an outer surface of the heater and adapted such that inlet air introduced into the outer plenum cools the outer surface.

8. The recuperative heater as claimed in claim 7, further including an inner plenum separated from the outer plenum by a heat conductive wall, the inner plenum being positioned inwardly of the outer plenum in a space substantially bounded by a wall of the combustion chamber and the heat conductive wall and adapted such that inlet air form the outer plenum passes through the channels into the inner plenum, from which it passes into the combustion chamber.

9. The recuperative heater as claimed in claim 7, wherein pairs of flow paths, between inlet air in the outer plenum and the inner plenum, and between the inlet air in the inner plenum and the combustion products in the combustion chamber approximate to contra-flow passes.

10. A recuperative heater for a combustion engine driving an electrical generator and supplying a heated fluid to a heating circuit, the heater comprising:

means for combusting fuel in a combustion chamber configured to transfer heat to a heater head of the engine;

a recuperative heat exchanger adapted for receiving combustion products from the combustion chamber, the recuperative heat exchanger having a plurality of parallel elongate channels arranged encircling the combustion chamber, the channels arranged to provide a contra-flow configuration between combustion product channels and inlet air channels for heat exchange therebetween, an insulator enclosing the channels, a first end of each combustion product channel receiving combustion products from the combustion chamber and an opposing end of each combustion product channel providing the combustion products to an exhaust gas heat exchanger;

the exhaust gas heat exchanger being adapted for receiving the combustion products from the recuperative heat exchanger, the exhaust gas heat exchanger having an exhaust gas passage adjacent to a jacket for receiving and heating the fluid by thermal transfer from the combustion products, the exhaust gas heat exchanger at least partially surrounding both the combustion chamber and the recuperative heat exchanger;

the recuperative heat exchanger further including inner and outer plenums divided by a heat conductive wall, the outer plenum being positioned adjacent to a top cover having an outer surface, the inner plenum being positioned inwardly of the outer plenum in a space substantially bounded by a wall of the combustion chamber and the heat conductive wall and adapted such that inlet air introduced into the outer plenum cools the top cover and passes through the channels into the inner plenum, from which it passes into the combustion chamber.

11. The recuperative heater as claimed in claim 1, wherein at least a portion of the combustion products are condensed in the exhaust gas heat exchanger.

12. The recuperative heater as claimed claim 1, wherein combustion products passing through the exhaust gas heat exchanger approximate a contra-flow action with the fluid flow through the jacket.

13. A combustion engine including a recuperative heater as claimed claim 1.

14. A stirling engine including a recuperative heater as claimed in claim 1.

15. A recuperative heater as claimed in claim 1 further including a coupling connectable to a heat source external to said engine, said coupling allowing externally heated products to be added to said combustion products from the combustion chamber entering the fluid heat exchanger.

* * * * *